United States Patent
Kinoshita et al.

(10) Patent No.: US 9,377,965 B2
(45) Date of Patent: Jun. 28, 2016

(54) STORAGE CONTROL DEVICE FOR CONTROLLING PHYSICAL STORAGE DEVICE IN STORAGE SYSTEM INCLUDING VIRTUAL STORAGE DEVICE, STORAGE SYSTEM INCLUDING PHYSICAL STORAGE DEVICE AND VIRTUAL STORAGE DEVICE, AND COMPUTER-READABLE RECORDING MEDIUM STORING CONTROL PROGRAM FOR PHYSICAL STORAGE DEVICE IN STORAGE SYSTEM INCLUDING VIRTUAL STORAGE DEVICE

(71) Applicant: FUJITSU LIMITED, Kawasaki-shi, Kanagawa (JP)

(72) Inventors: Tetsuya Kinoshita, Nagano (JP); Fumio Matsuo, Nagano (JP); Hidetoshi Nishi, Nagano (JP); Katsuo Enohara, Kawaguchi (JP); Takaaki Yamato, Nagano (JP); Takashi Murayama, Nagano (JP); Nobuyuki Hirashima, Nagano (JP); Yuki Furukawa, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 14/247,319

(22) Filed: Apr. 8, 2014

(65) Prior Publication Data
US 2014/0344517 A1   Nov. 20, 2014

(30) Foreign Application Priority Data
May 15, 2013   (JP) ................................. 2013-102964

(51) Int. Cl.
*G06F 12/00*   (2006.01)
*G06F 3/06*   (2006.01)

(52) U.S. Cl.
CPC .............. *G06F 3/0659* (2013.01); *G06F 3/061* (2013.01); *G06F 3/0607* (2013.01); *G06F 3/0632* (2013.01); *G06F 3/0686* (2013.01)

(58) Field of Classification Search
CPC ... G06F 3/0647; G06F 3/0607; G06F 3/0664; G06F 3/067
See application file for complete search history.

(56) References Cited

U.S. PATENT DOCUMENTS

| | | | |
|---|---|---|---|
| 2004/0143608 A1 | 7/2004 | Nakano et al. | |
| 2009/0113141 A1* | 4/2009 | Bullman | G06F 12/1483 711/147 |
| 2011/0099346 A1* | 4/2011 | Toshine | G06F 3/061 711/162 |

FOREIGN PATENT DOCUMENTS

| | | |
|---|---|---|
| JP | 2003-510679 | 3/2003 |
| JP | 2004-227127 | 8/2004 |
| JP | 2008-77423 | 4/2008 |
| WO | WO 01/22210 | 3/2001 |

* cited by examiner

*Primary Examiner* — Gurtej Bansal
(74) *Attorney, Agent, or Firm* — Staas & Halsey LLP (57) ABSTRACT

A storage control device that controls a physical storage device in a storage system, the storage control device includes: a receiving section configured to receive a command from the storage system including the physical storage device and a virtual storage device, the physical storage device configured to store data in a physical volume, the virtual storage device configured to intervene between a host device and the physical storage device and store data to be transmitted and received between the host device and the physical storage device as a virtual portable volume; a determining section configured to determine a type of the command; and a control section, if the command is an ejection command indicating an outside management of a first physical volume specified by the ejection command, configured to perform data protection setting on the first physical volume.

20 Claims, 11 Drawing Sheets

STORAGE CONTROL DEVICE FOR CONTROLLING PHYSICAL STORAGE DEVICE IN STORAGE SYSTEM INCLUDING VIRTUAL STORAGE DEVICE, STORAGE SYSTEM INCLUDING PHYSICAL STORAGE DEVICE AND VIRTUAL STORAGE DEVICE, AND COMPUTER-READABLE RECORDING MEDIUM STORING CONTROL PROGRAM FOR PHYSICAL STORAGE DEVICE IN STORAGE SYSTEM INCLUDING VIRTUAL STORAGE DEVICE

CROSS-REFERENCE TO RELATED APPLICATIONS

This application is based upon and claims the benefit of priority from the prior Japanese Patent Application No. 2013-102964 filed on May 15, 2013, the entire contents of which are incorporated herein by reference.

FIELD

Embodiments discussed herein are related to a storage control device, a storage system, and a computer-readable recording medium storing a control program.

BACKGROUND

A virtual tape device intervenes between a host device and a tape library device and stores data to be transmitted and received between the host device and the tape library device as a virtual tape volume (logical volume). By storing data on a randomly-accessible medium such as a magnetic disk device as the logical volume in this manner, the virtual tape device carries out tape operations on the magnetic disk device virtually. This allows the virtual tape device to reduce mechanical actions such as tape mounting, loading and unloading to realize high-speed processing.

Japanese Laid-open Patent Publications No. 2004-227127, No. 2003-510679, and No. 2008-77423 disclose related arts.

SUMMARY

According to an embodiment of the invention, a storage control device that controls a physical storage device in a storage system, the storage control device includes: a receiving section configured to receive a command from the storage system including the physical storage device and a virtual storage device, the physical storage device configured to store data in a physical volume, the virtual storage device configured to intervene between a host device and the physical storage device and store data to be transmitted and received between the host device and the physical storage device as a virtual portable volume; a determining section configured to determine a type of the command; and a control section, if the command is an ejection command indicating an outside management of a first physical volume specified by the ejection command, configured to perform data protection setting on the first physical volume.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In recent years, there has been a case in which a disk library device is coupled as a back end of the virtual tape device as well as a case in which a tape library device is coupled as described above. The virtual tape device executes substantially the same control operation irrespective of the type of the device coupled as the back end, for example, irrespective of whether the coupled device is a tape library device or a disk library device. This is related to that existing tape library devices are premised on an interface (I/F) used when they are channel-coupled directly to a host device, and is because it is preferable for the device coupled as the back end to support the same I/F irrespective of whether the higher-level device is a host device or a virtual tape device.

Therefore, from the viewpoint of the virtual tape device, operation when the export function to be described later is used involves no difference whether the device coupled as the back end is a tape library device or a disk library device and the same operation is possible irrespective of the type of the library device.

The export function of the virtual tape device is a function used mainly for backup of user data. When receiving an export (EXPORT) command from the host device, the virtual tape device issues a write instruction (write (WRITE) command) to the library device of the back end to save user data to a physical volume (PV) in the back end. In the following, the operation of the tape library device when the export function is used will be described with reference to FIGS. 10A and 10B, and the operation of the disk library device when the export function is used will be described with reference to FIGS. 11A and 11B.

Figure 10A:
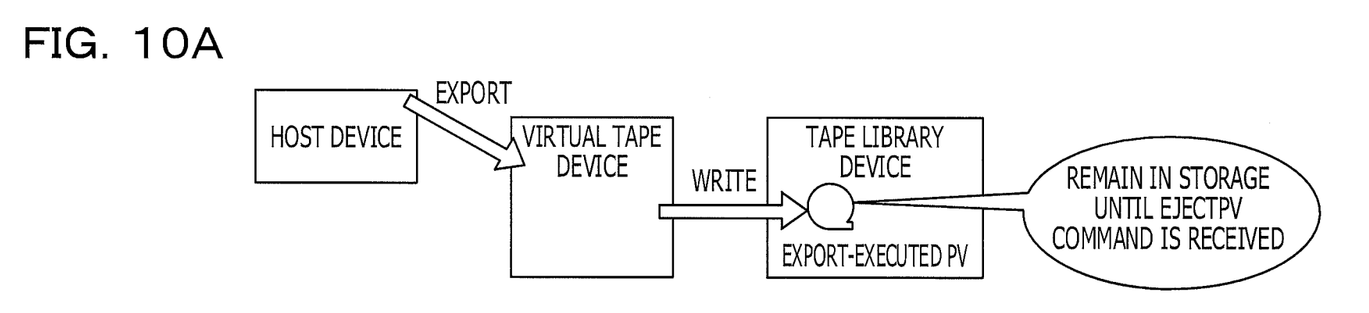
FIGS. 10A and 10B are a diagram for explaining an operation of a tape library device when an export function is used.
Figure 10B:
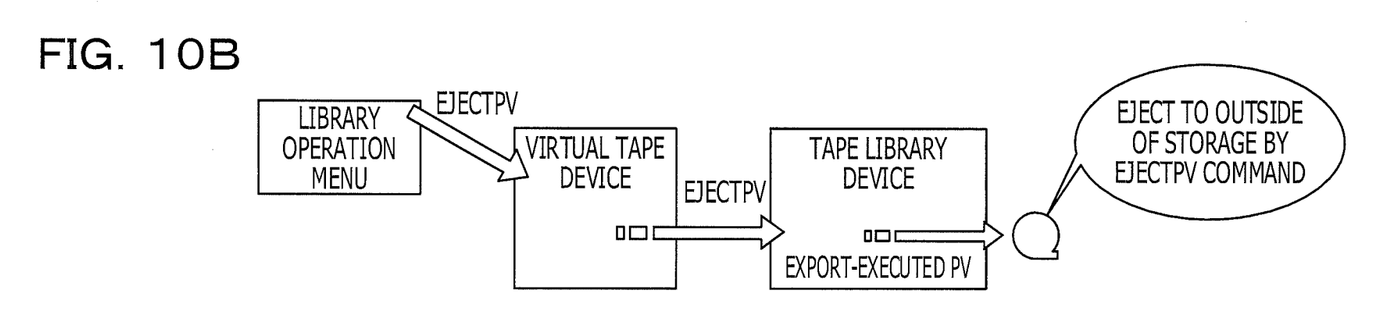

As illustrated in FIG. 10A, in the case of the tape library device, when receiving the EXPORT command from the host device, the virtual tape device issues the WRITE command to the tape library device to make backup-target data be saved to a PV. Thus, the EXPORT-executed PV that holds the backup-target data remains in the storage until an outside ejection command to be described later is received. Thereafter, if a user desires the outside management of the EXPORT-executed PV, as illustrated in FIG. 10B, the user issues the outside ejection (EjectPV) command indicating that this EXPORT-executed PV will be managed outside from the host device or a library operation menu on a user terminal or the like to the virtual tape device. When the EjectPV command is issued from the virtual tape device to the tape library device in association with the issue of the outside ejection (EjectPV) command, the EXPORT-executed PV specified by the EjectPV command is ejected from the tape library device to the outside of the storage. In this manner, in the case of the tape library device, the EXPORT-executed PV that holds the backup data is ejected to the outside of the storage to be managed. The PV ejected to the outside of the storage is managed outside the range of access from the virtual tape device physically and therefore the data maintainability is high.

Figure 11A:
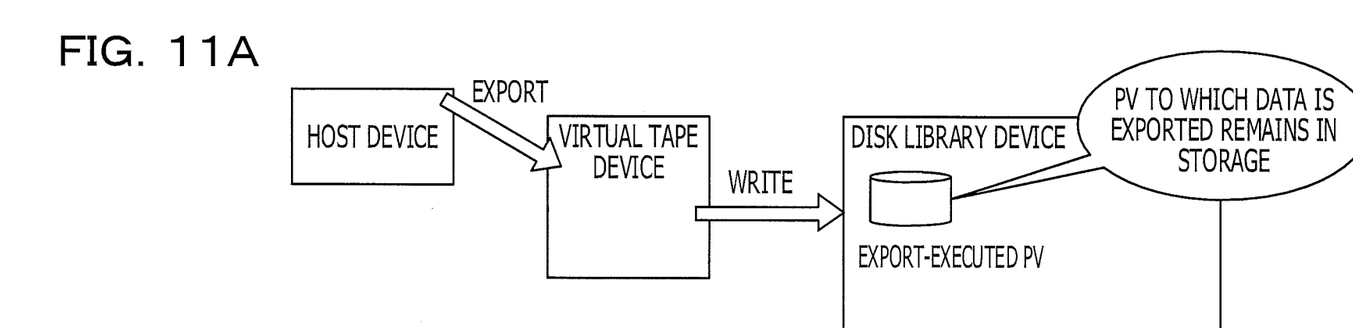
FIGS. 11A and 11B are a diagram for explaining an operation of a disk library device when the export function is used.
Figure 11B:
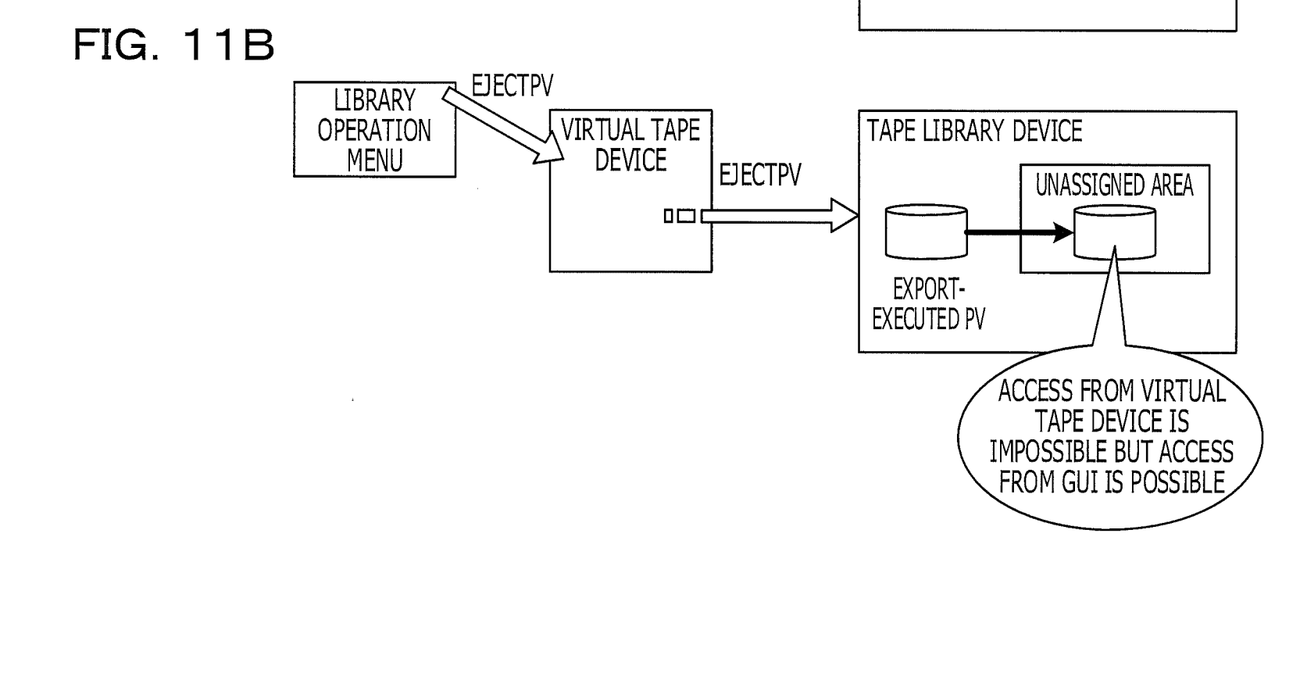

As illustrated in FIG. 11A, also in the case of the disk library device, when receiving the EXPORT command from the host device, the virtual tape device issues the WRITE command to the disk library device to make backup-target data be saved to a PV, similarly to the case of the tape library device. Thereafter, if a user desires the outside management of the EXPORT-executed PV, the user can issue the EjectPV command from the host device or the library operation menu on a user terminal or the like to the virtual tape device as illustrated in FIG. 11B. However, in the disk library device, the medium to hold data is a disk and thus the EXPORT-executed PV, to which data has been exported, is difficult to physically eject to the outside of the storage. Therefore, although the EjectPV command is received, actually outside management of the EXPORT-executed PV is not carried out.

For this reason, as illustrated in FIG. 11B, when receiving the EjectPV command from the library operation menu via the virtual tape device, the disk library device shifts the EXPORT-executed PV from a state of being managed in a normal area to a state of being managed in an unassigned (UNASSIGNED) area, without actually ejecting it to the outside of the storage. Thus, the EXPORT-executed PV is managed in the UNASSIGNED area although not ejected to the outside of the storage. Therefore, it is in the same state as that when it is virtually ejected to the outside of the storage, which inhibits access thereto from the virtual tape device. Accordingly, the EXPORT-executed PV can be set to a pseudo externally managed state.

In the disk library device, for the virtual tape device to again be accessible to the PV which is managed in the UNASSIGNED area by the EjectPV command, the library import function, which is an existing function of the disk library device, is used. Specifically, by executing the library import function, with a target PV specified, from a graphical user interface (GUI) of the disk library device, the target PV can be returned from the state of management in the UNASSIGNED area to the state of management in the normal area.

If the disk library device coupled to a back end of the virtual tape device operates in response to receiving an instruction by the same control operation as that from the virtual tape device to the tape library device, in the state in which the EXPORT-executed PV is managed in the UNASSIGNED area in accordance with the outside ejection instruction in the disk library device, the virtual tape device may not be able to access to the EXPORT-executed PV m but the GUI of the disk library device may be able to access to the EXPORT-executed PV. Therefore, the GUI may be able to issue an instruction to execute PV recycle processing (processing of deleting data in a PV and recycling the PV as a new PV), PV deletion processing, or the like to a PV which is managed in the UNASSIGNED area. An EXPORT-executed PV in the UNASSIGNED area may be recycled or deleted from the GUI and loss of data.

The embodiment will be described below with reference to the drawings.

[1] Configuration of Embodiment

Figure 1:
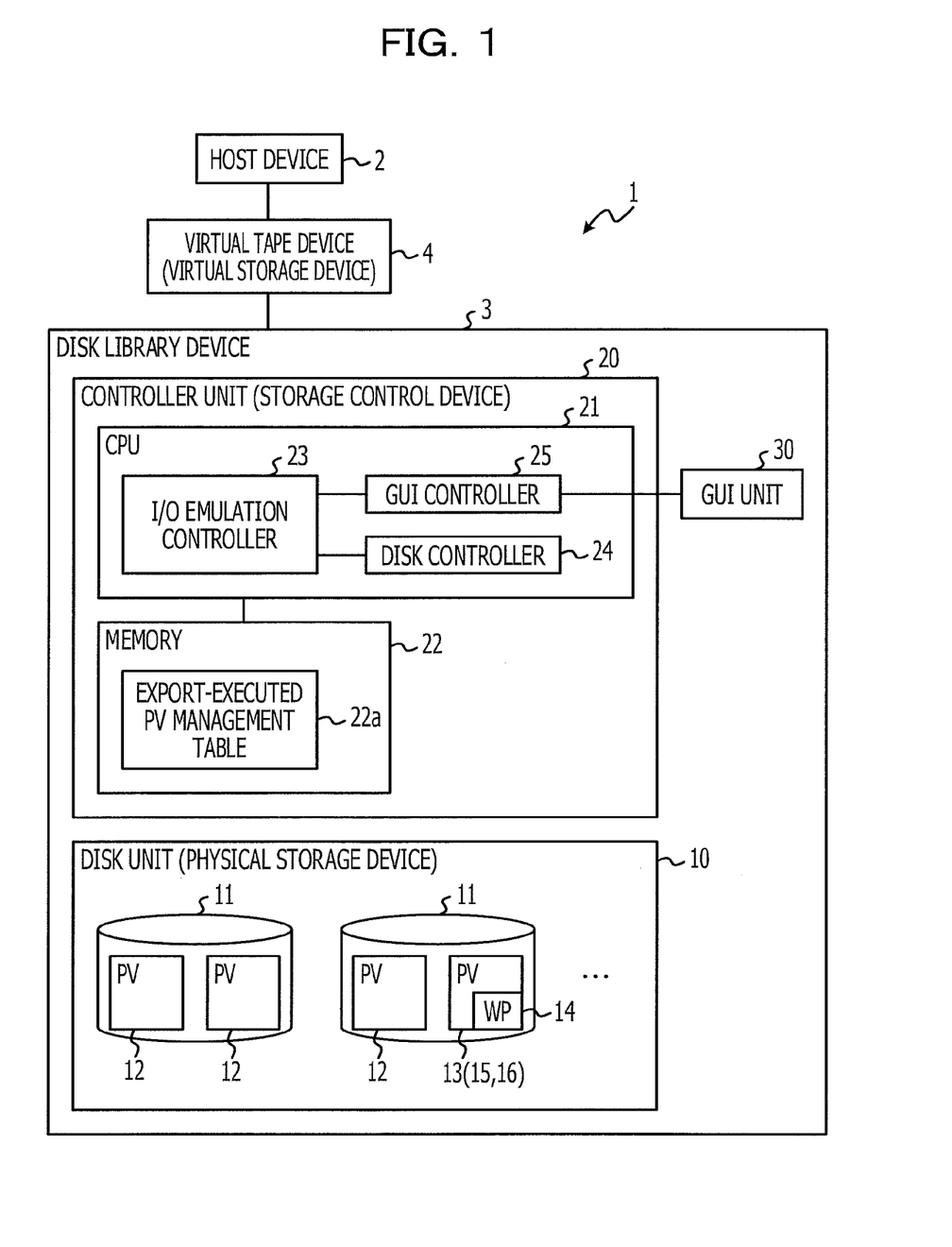
FIG. 1 is a block diagram illustrating a configuration of a storage system.
Figure 2:
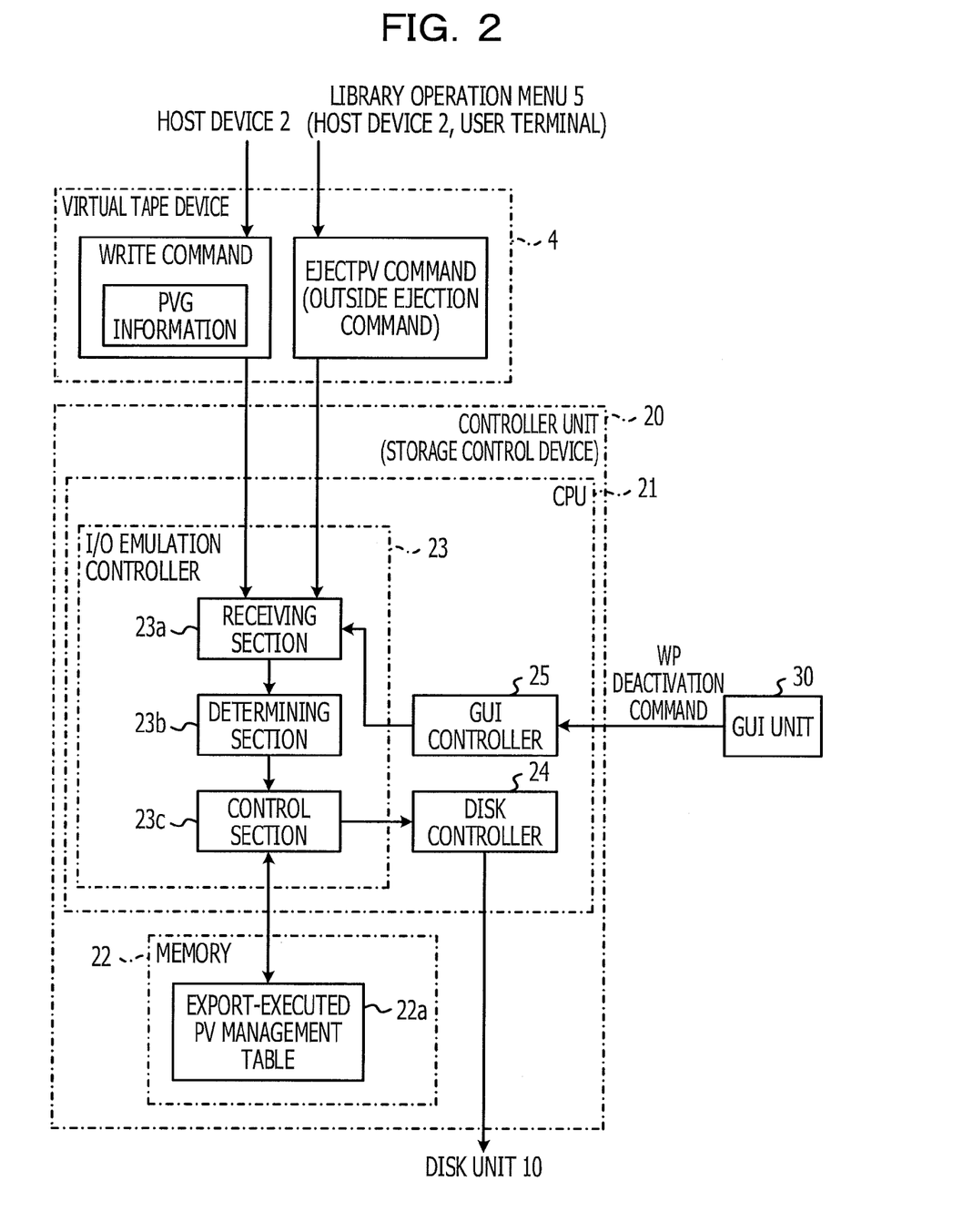
FIG. 2 is a block diagram illustrating a functional configuration of a controller unit (storage control device)
Figure 3:
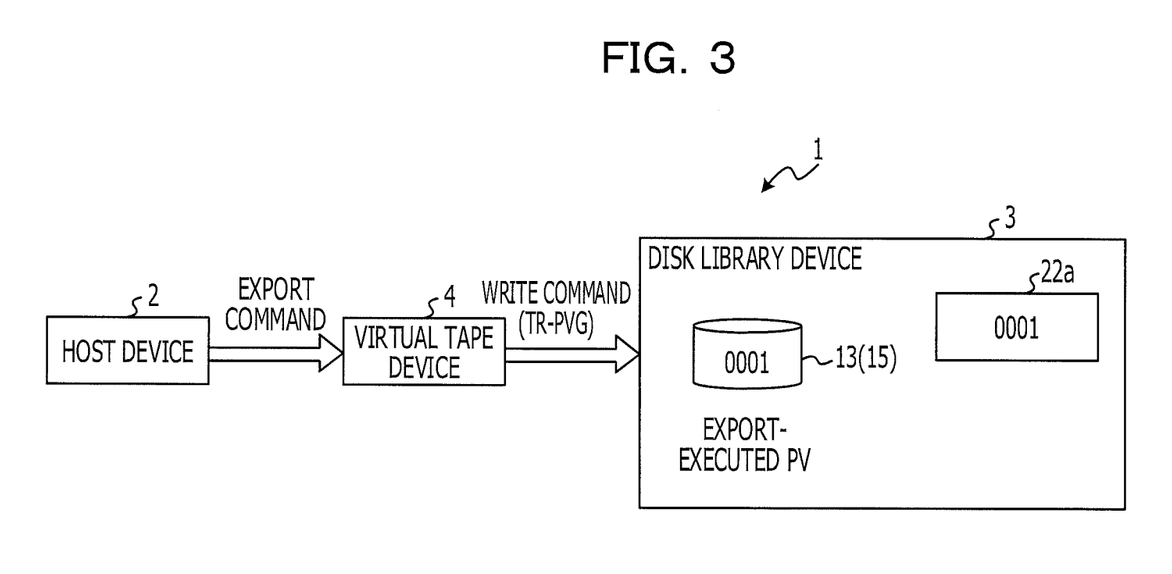
FIG. 3 is a diagram for explaining an operation of a storage system.
Figure 4:
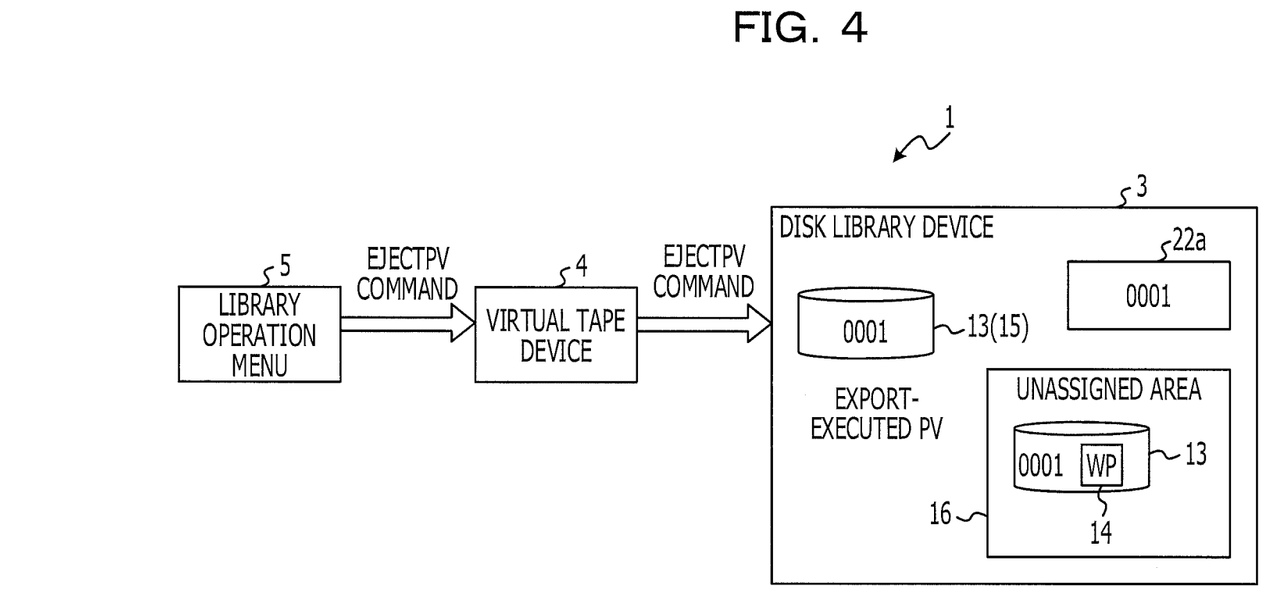
FIG. 4 is a diagram for explaining an operation of a storage system.
Figure 5:
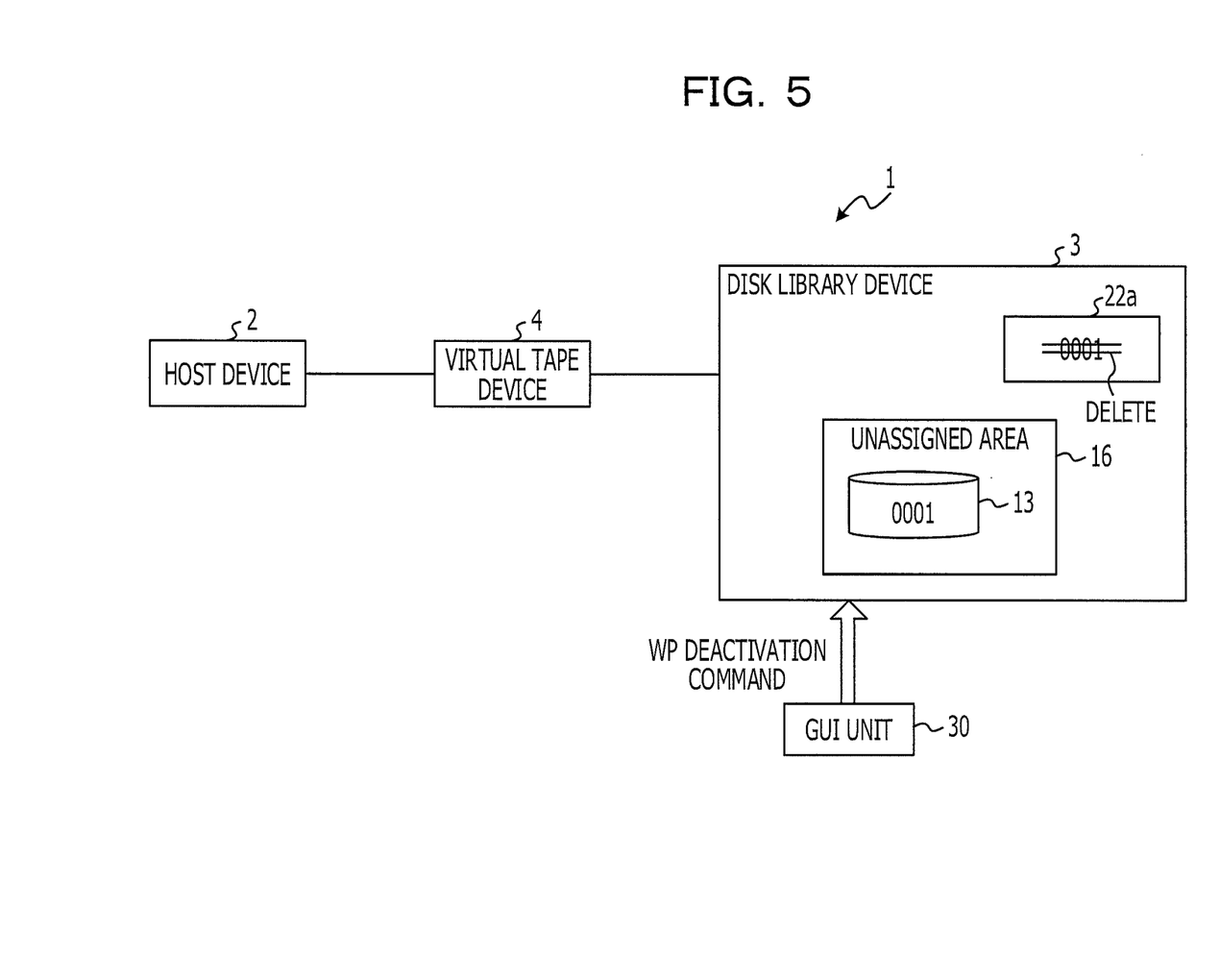
FIG. 5 is a diagram for explaining an operation of a storage system.

First, with reference to FIGS. 1 to 5, the configuration of a storage system and the functional configuration of a storage control device (controller unit) will be described. FIG. 1 is a block diagram illustrating a configuration of a storage system. FIG. 2 is a block diagram illustrating a functional configuration of a controller unit (storage control device) 20 of this embodiment. FIGS. 3 to 5 are diagrams for explaining an operation of a storage system. In FIG. 3, the operation of a disk library device that has received a WRITE command is illustrated. In FIG. 4, the operation of the disk library device that has received an EjectPV command is illustrated. In FIG. 5, the operation of the disk library device that has received a WP deactivation command is illustrated.

As illustrated in FIG. 1, the storage system 1 has a host device 2, a disk library device 3, and a virtual tape device 4. The virtual tape device (virtual storage device) 4 intervenes between the host device 2 and the disk library device 3 (disk unit 10 to be described later) and stores data to be transmitted and received between the host device 2 and the disk unit 10 as a virtual portable volume.

Here, the portable volume (portable medium, removable media) is a storage medium that can be managed outside the storage (ejected to the outside of the storage). For example, a tape volume (magnetic tape cartridge) is assumed as the virtual portable volume. As the portable volume, besides the tape volume, the following portable media may be assumed: flexible disk, Compact Disc (CD) (CD-Read Only Memory (CD-ROM), CD-Recordable (CD-R), CD-Rewritable (CD-RW), etc.), Digital Versatile Disc (DVD) (DVD-Read Only Memory (DVD-ROM), DVD-Random Access Memory (DVD-RAM), DVD-Recordable (DVD-R), DVD-Rewritable (DVD-RW), DVD-Plus Recordable (DVD+R), DVD-Plus Rewritable (DVD+RW), etc.), and Blu-ray Disc.

The virtual tape device 4 may include a general server device or a storage device (magnetic disk device or the like). As described above, by storing data in a randomly-accessible medium such as a magnetic disk device as a logical volume, the virtual tape device 4 carries out tape operations on the magnetic disk device virtually. Therefore, in the virtual tape device 4, mechanical actions such as tape mounting and loading/unloading may be reduced, thereby realizing high-speed processing.

The disk library device 3 is coupled to a back end of the virtual tape device 4. The disk library device 3 includes the disk unit 10, the controller unit 20, and a GUI unit 30.

The disk unit 10 may be a physical storage device that stores data in physical volumes (PV) 12 and 13, for example, may be a disk array device (RAID (Redundant Arrays of Inexpensive Disks) device) composed of plural disks 11. The PVs 12 and 13 are managed in a normal area 15 (to be described later) or an unassigned area 16 (to be described later) in the disk (storage medium) 11 that is difficult to manage outside the storage (eject to the outside of the storage). The disk unit 10 receives various kinds of requests from the host device 2 via the virtual tape device 4 and the controller unit 20 and executes various kinds of operation according to the requests, e.g. a write operation, a read operation, and a backup operation. Each disk 11 is e.g. a hard disk drive (HDD) and stores user data accessed by the host device 2, various kinds of control information, and so forth. As each disk 11, a storage medium such as a solid state device (SSD) may be used instead of the HDD.

The controller unit (storage control device) 20 controls the disk unit (physical storage device) 10 and includes a central processing unit (CPU: processor, computer) 21 and a memory 22. The GUI unit (user interface unit) 30 is operated by a user and inputs various kinds of instructions and various kinds of information to the CPU 21. The GUI unit 30 includes input equipment such as mouse and keyboard and display equipment such as a liquid crystal display (LCD).

The CPU 21 executes processing in accordance with an operating system (OS) and so forth to carry out various kinds of control. By executing a control program stored in the memory 22, the CPU 21 functions as an input/output (I/O) emulation controller 23, a disk controller 24, and a GUI controller 25. Furthermore, as illustrated in FIG. 2, the I/O emulation controller 23 functions as a receiving section 23a, a determining section 23b, and a control section 23c. The memory 22 stores various kinds of information including an EXPORT-executed PV management table 22a to be described later besides the above-described control program and includes a random access memory (RAM) or the like.

The disk controller 24 controls the disk unit 10 in accordance with an instruction from the I/O emulation controller 23. The GUI controller 25 is coupled to the GUI unit 30 and receives various kinds of instructions and various kinds of information input from the GUI unit 30 by a user to notify the I/O emulation controller 23 of them. The I/O emulation controller 23 receives various kinds of commands and executes various kinds of processing in accordance with the received command. As described above, the I/O emulation controller 23 functions as the receiving section 23a, the determining section 23b, and the control section 23c.

The receiving section 23a receives various kinds of commands. For example, as illustrated in FIGS. 2 to 4, the receiving section 23a receives commands (WRITE command, EjectPV command) from the host device 2 and a library operation menu 5 via the virtual tape device 4. Furthermore, as illustrated in FIGS. 2 and 5, the receiving section 23a receives a command (WP deactivation command) from the GUI unit 30 via the GUI controller 25.

The determining section 23b determines the type of the command received by the receiving section 23a (hereinafter, referred to as the received command). For example, the determining section 23b determines which of at least the following three types of commands (1) to (3) the received command is.

(1) EXPORT-corresponding write command (WRITE command; see FIGS. 2 and 3) issued by the virtual tape device 4 in response to an EXPORT command from the host device 2 that instructs data backup. If the received command is the WRITE command and export information (TR-PVG) is specified as physical volume group (PVG) information in the header part of the WRITE command, the determining section 23b determines that the received command is the WRITE command corresponding to EXPORT. The transfer-physical volume group (TR-PVG) may be set as the PVG information in the header part of the WRITE command generated based on the EXPORT function of the host device 2. The transfer-physical volume group (TR-PVG) may be always set as the PVG information in the header part of the WRITE command. Therefore, by checking that the PVG information is the TR-PVG, the determining section 23b determines that the received command is the WRITE command corresponding to EXPORT.

(2) Ejection command (EjectPV command) that is issued from the library operation menu 5 on the host device 2, on a user terminal (not illustrated) or the like via the virtual tape device 4 and instructs outside management (outside ejection) of a specified PV.

(3) Release command (WP release command) that is input from the GUI unit 30 by a user and instructs a release of the data-protected state (WP state) for a specified PV.

If it is determined by the determining section 23b that the received command is the above-described command (1), for example, the EXPORT-corresponding WRITE command, the control section 23c registers the identification information of the EXPORT-target PV specified by the WRITE command in the EXPORT-executed PV management table 22a in the memory 22. In the example illustrated in FIG. 3, identification information 0001 of an EXPORT-target PV is registered in the EXPORT-executed PV management table 22a. Furthermore, the control section 23c makes the disk controller 24 save backup-target data to be saved to the specified EXPORT-target PV in the disk unit 10 and manages the specified EXPORT-target PV as the EXPORT-executed physical volume 13.

If it is determined by the determining section 23b that the received command is the above-described command (2), for example, the EjectPV command, the control section 23c executes data protection setting (WP setting) for the ejection-target PV specified by the EjectPV command. For example, if the received command is the EjectPV command, the control section 23c refers to the EXPORT-executed PV management table 22a and determines whether or not the identification information of the ejection-target PV specified by the EjectPV command is registered as the identification information of the EXPORT-executed PV 13 in the EXPORT-executed PV management table 22a. If the identification information of the ejection-target PV (e.g. 0001) is registered as the identification information of the EXPORT-executed PV 13 in the EXPORT-executed PV management table 22a, the control section 23c executes the data protection setting (WP setting) for this EXPORT-executed PV 13.

At this time, as illustrated in FIGS. 1 and 4, the control section 23c sets WP information (write protect information) 14 indicating the data-protected state for management information of the ejection-target PV 13. Thus, the data protection setting is executed for the ejection-target PV 13 and write access and delete access to the ejection-target PV 13 may be inhibited.

Moreover, if the received command is the EjectPV command, the control section 23c shifts the ejection-target PV 13 from the state of management in the normal area 15 in the disk unit 10 (disk 11) to the state of management in the unassigned area (UNASSIGNED area) 16 in the disk unit 10 (disk 11). Thus, although the instruction to execute ejection (eject) is issued from the library operation menu 5, the ejection-target PV 13 is not actually ejected but virtually ejected from the disk unit 10 to the outside of the storage by emulation.

If it is determined by the determining section 23b that the received command is the above-described command (3), for example, the WP release command from the GUI unit 30, the control section 23c releases the data protection setting (WP setting) for the deactivation-target PV specified by the WP release command. For example, if the received command is the WP release command, the control section 23c refers to the EXPORT-executed PV management table 22a and determines whether or not the identification information of the release-target PV specified by the WP release command is registered as the identification information of the EXPORT-executed PV 13 in the EXPORT-executed PV management table 22a. If the identification information of the release-target PV (e.g. 0001) is registered as the identification information of the EXPORT-executed PV 13 in the EXPORT-executed PV management table 22a, the control section 23c releases the data protection setting for the release-target PV. At this time, as illustrated in FIG. 5, the control section 23c deletes the identification information of the release-target PV specified by the WP release command from the EXPORT-executed PV management table 22a. In addition, the control section 23c deletes the WP information 14 set in the management information of the PV 13 to release the data protection setting for the release-target PV.

[2] Operation of Embodiment

Next, with reference to FIGS. 6 to 9, explanation will be made about the operation of the storage system 1 and the controller unit (storage control device) 20, formed in the above-described manner. First, in accordance with a flowchart illustrated in FIG. 6 (operations S1 to S8), the operation of the controller unit (storage control device) 20 will be explained.

Figure 6:
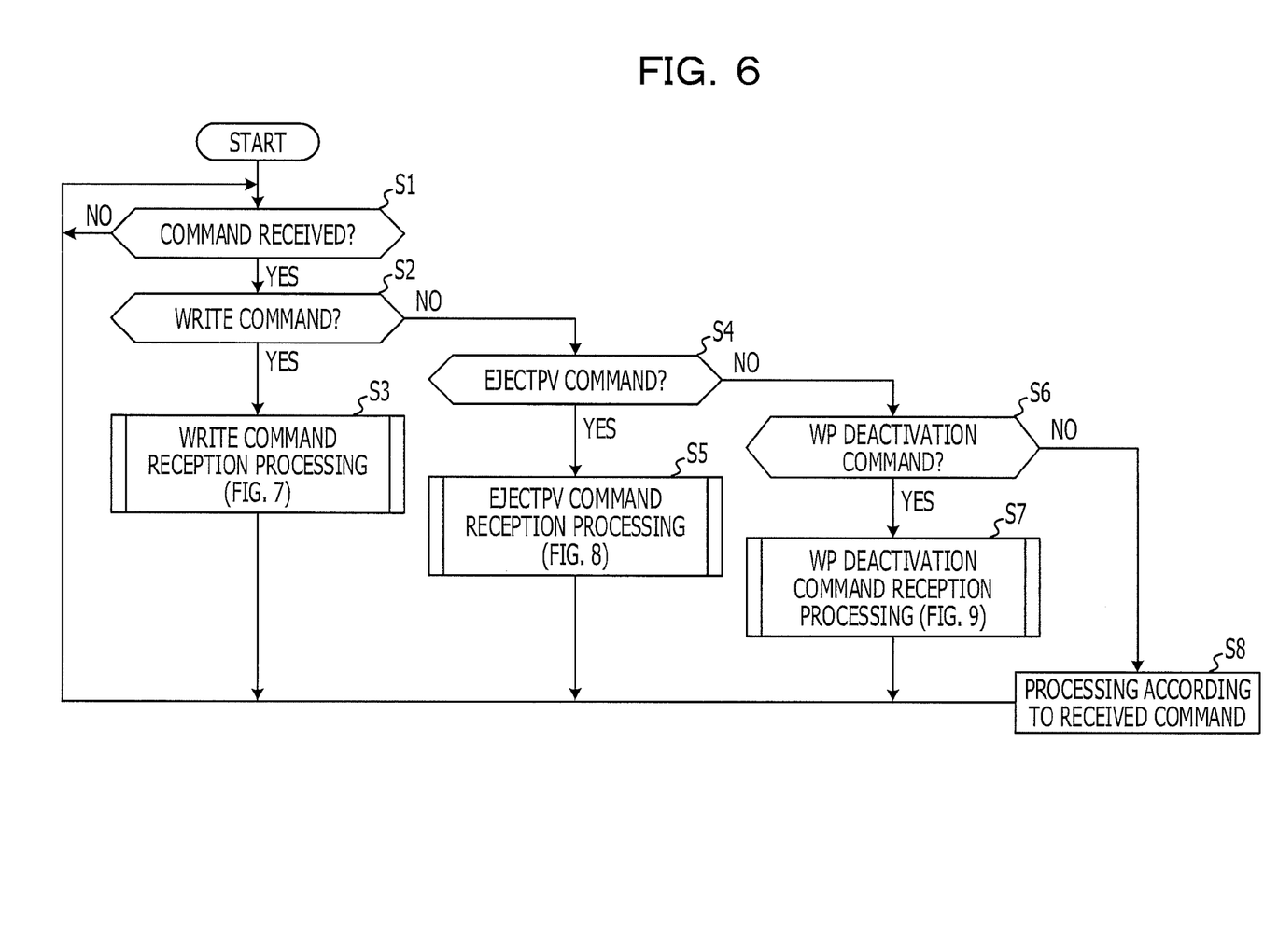
FIG. 6 is a flowchart for explaining an operation of a controller unit (storage control device)

In the I/O emulation controller 23, the receiving section 23a waits for reception of a command (NO route of operation S1). If the receiving section 23a receives any command (YES route of operation S1), the determining section 23b determines the type of the received command (operations S2, S4, and S6).

Figure 7:
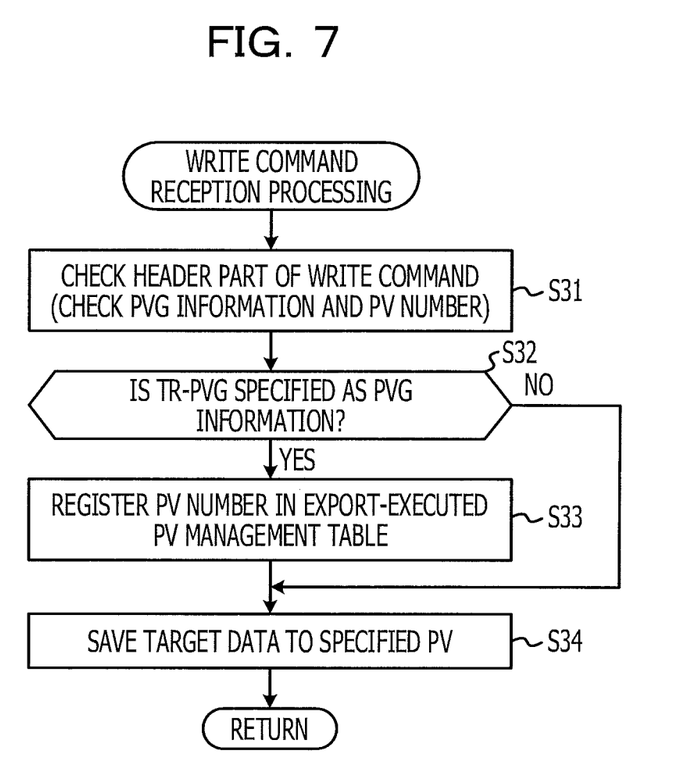
FIG. 7 is a flowchart for explaining WRITE command reception a processing.

If it is determined by the determining section 23b that the received command is the WRITE command (YES route of operation S2), the determining section 23b and the control section 23c execute WRITE command reception processing illustrated in FIG. 7 (operation S3) and then return to the processing of the operation S1.

Figure 8:
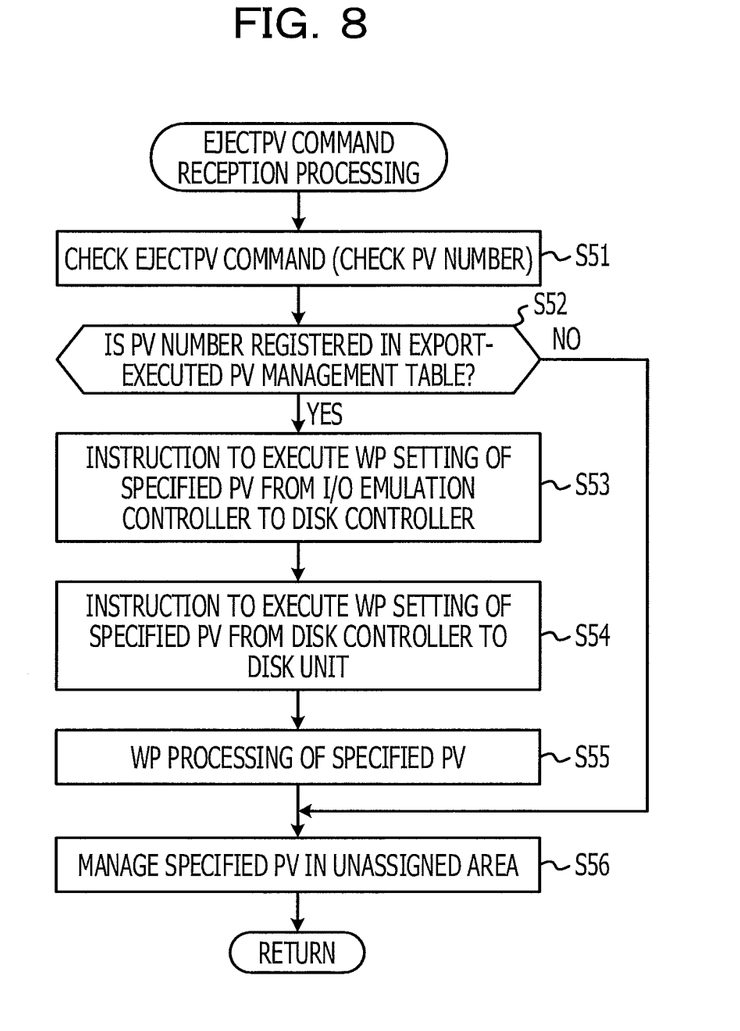
FIG. 8 is a flowchart for explaining EjectPV command reception processing.

If it is determined by the determining section 23b that the received command is the EjectPV command (NO route of step S2 and YES route of operation S4), the control section 23c executes EjectPV command reception processing illustrated in FIG. 8 (operation S5) and then returns to the processing of the operation S1.

Figure 9:
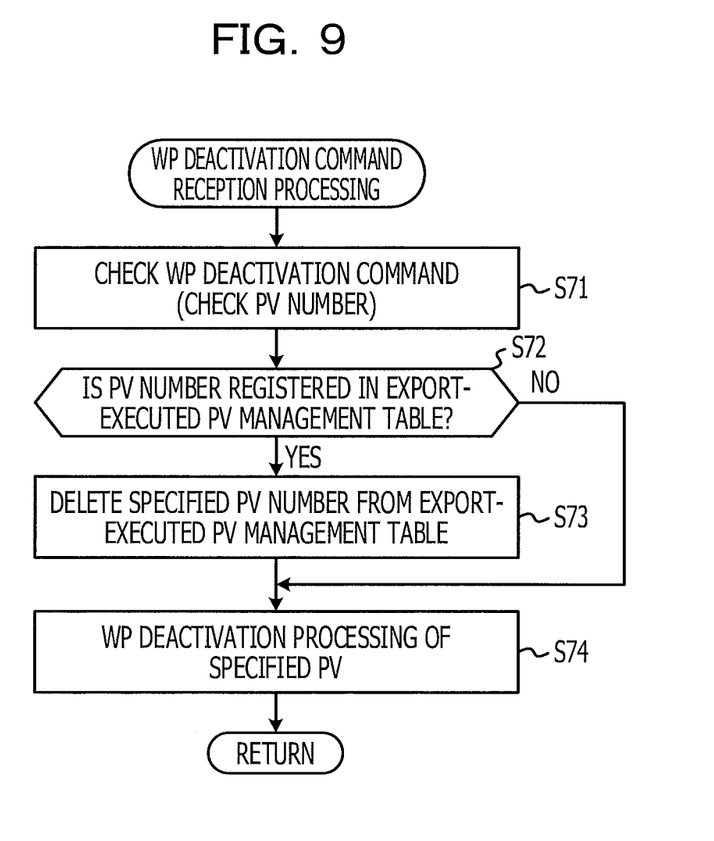
FIG. 9 is a flowchart for explaining WP deactivation command reception processing.

If it is determined by the determining section 23b that the received command is the WP deactivation command (NO route of operation S4 and YES route of operation S6), the control section 23c executes WP release command reception processing illustrated in FIG. 9 (operation S7) and then returns to the processing of the operation S1.

If it is determined by the determining section 23b that the received command is not the WP release command (NO route of operation S6), the received command corresponds with none of the above-described commands (1) to (3). Thus, the control section 23c executes processing according to the received command (step S8) and then returns to the processing of the operation S1.

Subsequently, in accordance with a flowchart illustrated in FIG. 7 (operations S31 to S34), the WRITE command reception processing (operation S3 in FIG. 6) will be explained. The determining section 23b and the control section 23c execute the WRITE command reception processing in the procedure illustrated in FIG. 7 when, as illustrated in FIG. 3, the WRITE command is issued from the virtual tape device 4 coupled to the higher level of the disk library device 3 and is received by the receiving section 23a of the I/O emulation controller 23 in the disk library device 3.

First, the determining section 23b and the control section 23c check the header part of the WRITE command to check the PVG information in the header part of the WRITE command and a PV number (identification information of the PV) specified by the WRITE command (operation S31). Then, if it is checked by the determining section 23b that the PVG information in the header part of the WRITE command is the TR-PVG (export information) (YES route of operation S32), it is determined that the received command is the WRITE command corresponding to EXPORT.

In association with this, as illustrated in FIG. 3, the control section 23c registers the identification information (PV number) of the EXPORT-target PV specified by the WRITE command in the EXPORT-executed PV management table 22a in the memory 22 (operation S33). Thereafter, the control section 23c makes the disk controller 24 save backup-target data to be saved to the specified EXPORT-target PV in the disk unit 10 and manages the specified EXPORT-target specified PV as the EXPORT-executed physical volume 13 (operation S34).

On the other hand, if it is checked that the PVG information in the header part of the WRITE command is not the TR-PVG (export information) (NO route of operation S32), the control section 23c executes normal WRITE command reception processing, for example, processing of writing target data to a specified PV (operation S34), without executing the processing of the operation S33.

Subsequently, in accordance with a flowchart illustrated in FIG. 8 (operations S51 to S56), the EjectPV command reception processing (operation S5 in FIG. 6) will be explained. The control section 23c executes the EjectPV command reception processing in the procedure illustrated in FIG. 8 when, as illustrated in FIG. 4, the EjectPV command is issued from the virtual tape device 4 coupled to the higher level of the disk library device 3 and is received by the receiving section 23a of the I/O emulation controller 23 and it is determined by the determining section 23b that the received command is the EjectPV command.

First, the control section 23c checks the EjectPV command to check the PV number (identification information of the PV) specified by the EjectPV command (operation S51). Then, the control section 23c refers to the EXPORT-executed PV management table 22a and determines whether or not the PV number checked in the operation S51 is registered as the PV number of the EXPORT-executed PV 13 in the EXPORT-executed PV management table 22a (operation S52).

If the PV number is registered as that of the EXPORT-executed PV 13 in the EXPORT-executed PV management table 22a (YES route of operation S52), the control section 23c executes the data protection setting (WP setting) for the EXPORT-executed PV 13 (operations S53 to S55). For example, the control section 23c issues an instruction to execute the WP setting of the specified PV 13 from the I/O emulation controller 23 to the disk controller 24 (operation S53).

Then, an instruction to execute the WP setting of the specified PV 13 is issued from the disk controller 24 to the disk unit 10 (operation S54) and the WP information 14 indicating the data-protected state is set in the management information of the specified PV 13 in the disk unit 10 (operation S55). Thus, the data protection setting (WP processing) is executed for the ejection-target PV 13 and write access and delete access to the ejection-target PV 13 may be inhibited.

Thereafter, as illustrated in FIG. 4, the control section 23c shifts the ejection-target PV 13 from the state of management in the normal area 15 in the disk 11 to the state of management in the UNASSIGNED area 16 in the disk 11 (operation S56). Thus, although the instruction to execute ejection is issued from the library operation menu 5, the ejection-target PV 13 is not actually ejected but virtually ejected from the disk unit 10 to the outside of the storage by emulation.

On the other hand, if the PV number is not registered as that of the EXPORT-executed PV 13 in the EXPORT-executed PV management table 22a (NO route of operation S52), the control section 23c shifts the ejection-target PV 13 from the state of management in the normal area 15 in the disk 11 to the state of management in the UNASSIGNED area 16 in the disk 11 (operation S56) without executing the processing of the operations S53 to S55, for example, the data protection setting processing. For the PV 13 managed in the UNASSIGNED area 16 without executing the data protection setting processing in this manner, an instruction to execute recycle processing/deletion processing from the GUI unit 30 is accepted and recycling or deletion of the PV 13 may be executed.

Subsequently, in accordance with a flowchart illustrated in FIG. 9 (operations S71 to S74), the WP relief command reception processing (operation S7 in FIG. 6) will be explained. Relief from the protected state for the PV 13 set to the data-protected state in the above-described manner is executed by a relief instruction from an operator (user). The relief may be executed only by the relief instruction from an operator (user). For example, the operator may view the PV 13 managed in the UNASSIGNED area 16 from the GUI unit 30 of the disk library device 3. Furthermore, as illustrated in FIG. 5, by issuing the WP relief command to the PV 13 in the WP state from the GUI unit 30 of the disk library device 3, the operator may instruct relief of the WP state for the specified PV 13.

The control section 23c executes the WP relief command reception processing in the procedure illustrated in FIG. 9 when, as illustrated in FIG. 5, the WP relief command is issued from the GUI unit 30 and is received by the receiving section 23a via the GUI controller 25 and it is determined by the determining section 23b that the received command is the WP relief command.

First, the control section 23c checks the WP relief command to check the PV number (identification information of the PV) specified by the WP relief command (operation S71). Then, the control section 23c refers to the EXPORT-executed PV management table 22a and determines whether or not the PV number checked in the operation S71 is registered as the PV number of the EXPORT-executed PV 13 in the EXPORT-executed PV management table 22a (operation S72).

If the PV number is registered as that of the EXPORT-executed PV 13 in the EXPORT-executed PV management table 22a (YES route of operation S72), the control section 23c reliefs the data protection setting for the relief-target PV 13 specified by the WP deactivation command. At this time, as illustrated in FIG. 5, the control section 23c deletes the PV number specified by the WP relief command from the EXPORT-executed PV management table 22a (operation S73). Furthermore, as illustrated in FIG. 5, the control section 23c deletes the WP information 14 set in the management information of the relief-target PV 13 to relief the data protection setting for the deactivation-target PV 13 (operation S74).

On the other hand, if the PV number is not registered as that of the EXPORT-executed PV 13 in the EXPORT-executed PV management table 22a (NO route of operation S72), the control section 23c deletes the WP information 14 set in the management information of the relief-target PV 13 to relief the data protection setting for the relief-target PV 13 (operation S74) without executing the processing of the operation S73, for example, processing of deleting the PV number from the EXPORT-executed PV management table 22a.

According to the storage system 1 and the controller unit 20, when the EjectPV command (outside ejection instruction) is received for the EXPORT-executed PV 13 in the disk library device 3 (disk unit 10), the PV 13 is set to the data-protected state. The PV 13 may be automatically set to the data-protected state. Therefore, the EXPORT-executed PV 13 enters the state of management in the UNASSIGNED area 16 and write access and delete access to the PV 13 may be inhibited even when access from the GUI unit 30 is permitted by the library import function.

Therefore, loss of data caused by accidental recycling or deletion of the EXPORT-executed PV 13 in the UNASSIGNED area 16 from the GUI unit 30 may be reduced. High data maintainability may be secured which is substantially equivalent to that of the tape library device, which executes physical outside ejection, even in the disk library device 3, which executes virtual outside ejection of the PV 13, without making the virtual tape device 4 be aware of the type of the library device of a back end.

Furthermore, the data-protected state of the PV 13 is relieved when an operator operates the GUI unit 30 to instruct a relief using the WP deactivation command. For example, if a user desires access for writing, deletion, etc. to the PV 13 in the data-protected state, the operator operates the GUI unit 30 to issue the WP relief command to the controller unit 20.

In association with this, if the PV number specified by the WP deactivation command is registered in the EXPORT-executed PV management table 22a in the controller unit 20 that has received the WP relief command, the WP information 14 set in the management information of the relief-target PV 13 is deleted and the data protection setting (file-protected state) for the deactivation-target PV 13 is relieved. Therefore, the above-described access to the PV 13 managed in the UNASSIGNED area 16 may be performed according to need while ensuring the data maintainability in the disk library device 3.

Moreover, because data maintainability equivalent to that of the tape library device may be realized in the disk library device 3 as described above, outside management and operations of the PV in the disk library device 3 may be enabled. Therefore, restrictions on the number of managed PVs attributed to the upper limit of the number of slots of the disk library device 3 may be alleviated and the new PVs 12 may be managed by slots made vacant by the outside management.

Although the preferred embodiment is described in detail above, this invention is not limited to such a specific embodiment and various modifications and changes can be made without departing from the gist of this invention.

All or part of functions as the above-described I/O emulation controller 23 (receiving section 23a, determining section 23b, control section 23c), disk controller 24, and GUI controller 25 is realized by execution of a certain application program (control program) by a computer (including CPU, information processing device, and various kinds of terminals).

The application program is provided in such a form as to be recorded in a computer-readable recording medium such as flexible disk, CD (CD-ROM, CD-R, CR-RW, etc.), DVD (DVD-ROM, DVD-RAM, DVD-R, DVD-RW, DVD+R, DVD+RW, etc.), and Blu-ray Disc. In this case, the computer reads the program from the recording medium and transfers the program to an internal storage device or an external storage device to store and use the program.

The computer may be a concept including hardware and an OS and may mean hardware that operates under control by the OS. If the OS is unnecessary and the hardware is operated by an application program alone, the hardware itself may be equivalent to the computer. The hardware may include at least a microprocessor such as a CPU and a unit to read a computer program recorded in a recording medium. The above-described application program includes a program code to cause a computer like the above-described one to realize functions as the I/O emulation controller 23 (receiving section 23a, determining section 23b, control section 23c), the disk controller 24, and the GUI controller 25. Furthermore, part of the functions may be realized not by the application program but by the OS.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device that controls a physical storage device in a storage system, the storage control device comprising:
   a memory configured to store a management table; and
   a processor configured to perform operations including:
   receiving a command from the storage system including the physical storage device and a virtual storage device, the physical storage device configured to store data in a physical volume, the virtual storage device configured to intervene between a host device and the physical storage device and store data to be transmitted and received between the host device and the physical storage device as a virtual portable volume;
   registering, when determining that the command is an export-corresponding write command from the virtual storage device, identification information of a third physical volume specified by the export-corresponding write command in the management table;
   comparing, when the command is an ejection command indicating an outside management of a first physical volume specified by the ejection command, the identification information of the first physical volume with the identification information of the third physical volume in the management table; and
   performing data protection setting on the first physical volume when the identification information of the first physical volume accords with the identification information of the third physical volume in the management table.

2. The storage control device according to claim 1, wherein the physical volume is a storage medium that is incapable of being managed outside the physical storage device, and the portable volume is a tape volume.

3. The storage control device according to claim 1, wherein the processor sets a data-protected state to management information of the first physical volume, and inhibits write access and delete access to the first physical volume.

4. The storage control device according to claim 1, wherein,
   when the command is the ejection command, the processor virtually ejects the first physical volume from the physical storage device by shifting the first physical volume from a first state in which the physical volume is managed in a normal area in the physical storage device to a second state in which the physical volume is managed in an unassigned area in the physical storage device.

5. The storage control device according to claim 1, wherein the storage system has a user interface configured to receive a relief command to relieve the data protection setting with an operation of a user,
   wherein the processor relieves the data protection setting of a second physical volume specified by the relief command.

6. The storage control device according to claim 1, wherein the export-corresponding write command corresponds to an export command from the host device that orders data backup, and backup-target data is saved to the third physical volume to manage the third physical volume as a exported physical volume in the physical storage device.

7. The storage control device according to claim 6, wherein the processor is configured to determine that the command is the export-corresponding write command when the command is a write command and export information is specified in physical volume group information of the write command.

8. The storage control device according to claim 6, wherein when the command is a relief command to relieve the data protection setting with an operation of a user, the processor is configured to relieve the data protection setting for a second physical volume when the identification information of the second physical volume is registered as identification information of the exported physical volume in the management table.

9. A storage system including:
   a physical storage device configured to store data in a physical volume;
   a virtual storage device configured to intervene between a host device and the physical storage device and store data to be transmitted and received between the host device and the physical storage device as a virtual portable volume; and
   a storage control device configured to control the physical storage device, the storage control device being configured to:
   receive a command;
   register, when determining that the command is an export-corresponding write command from the virtual storage device, identification information of a third physical volume specified by the export-corresponding write command in a management table;
   compare, when the command is an ejection command indicating an outside management of a first physical volume specified by the ejection command, the identification information of the first physical volume with the identification information of the third physical volume in the management table; and
   perform data protection setting on the first physical volume when the identification information of the first physical volume accords with the identification information of the third physical volume in the management table.

10. The storage system according to claim 9, wherein the physical volume is a storage medium that is incapable of being managed outside the physical storage device, and the portable volume is a tape volume.

11. The storage system according to claim 9, wherein the storage control device sets a data-protected state to management information of the first physical volume, and inhibits write access and delete access to the first physical volume.

12. The storage system according to claim 9, wherein when the command is the ejection command, the storage control device virtually ejects the first physical volume from the physical storage device by shifting the first physical volume from a first state in which the physical volume is managed in a normal area in the physical storage device to a second state in which the physical volume is managed in an unassigned area in the physical storage device.

13. The storage system according to claim 9, wherein
the storage system has a user interface configured to receive a relief command to relieve the data protection setting with an operation of a user,
wherein the storage control device relieves the data protection setting of a second physical volume specified by the relief command.

14. The storage system according to claim 9, wherein
the command is an export-corresponding write command corresponds to an export command from the host device that orders data backup, and backup-target data is saved to the third physical volume to manage the third physical volume as a exported physical volume in the physical storage device.

15. The storage system according to claim 14, wherein
the storage control device is configured to determine that the command is the export-corresponding write command when the command is a write command and export information is specified in physical volume group information of the write command.

16. The storage system according to claim 14, wherein
when the command is a relief command to relieve the data protection setting with an operation of a user, the storage control device is configured to relieve the data protection setting for a second physical volume if the identification information of the second physical volume is registered as identification information of the exported physical volume in the management table.

17. A non-transitory computer-readable recording medium storing a control program to cause a computer to execute operations, the operations comprising:
receiving a command from a storage system including a physical storage device and a virtual storage device, the physical storage device configured to store data in a physical volume, the virtual storage device configured to intervene between a host device and the physical storage device and store data to be transmitted and received between the host device and the physical storage device as a virtual portable volume;
registering, when determining that the command is an export-corresponding write command from the virtual storage device, identification information of a third physical volume specified by the export-corresponding write command in the management table;
comparing, when the command is an ejection command indicating an outside management of a first physical volume specified by the ejection command, the identification information of the first physical volume with the identification information of the third physical volume in the management table; and
performing data protection setting on the first physical volume when the identification information of the first physical volume accords with the identification information of the third physical volume in the management table.

18. The non-transitory computer-readable recording medium according to claim 17, further comprising,
relieving the data protection setting of a second physical volume specified by a relief command from a user interface in the storage system with an operation of a user.

19. The non-transitory computer-readable recording medium according to claim 17, wherein a data-protected state is set to management information of the first physical volume, and write access and delete to the first physical volume are inhibited.

20. The non-transitory computer-readable recording medium according to claim 17, wherein, if the command is the ejection command, the first physical volume is virtually ejected from the physical storage device by shifting the first physical volume from a first state in which the physical volume is managed in a normal area in the physical storage device to a second state in which the physical volume is managed in an unassigned area in the physical storage device.

* * * * *